Patented Sept. 11, 1934

1,973,472

UNITED STATES PATENT OFFICE 1,973,472

PURIFICATION OF METHYL-PARA-AMINO PHENOL

Arthur W. M. Dickins and Charles R. Fordyce, Rochester, N. Y., assignors to Eastman Kodak Company, Rochester, N. Y., a corporation of New York No Drawing. Application March 15, 1933,
Serial No. 660,978

3 Claims. (Cl. 260—130)

This invention relates to a process of purifying methyl-p-amino phenol, and more particularly to the removal therefrom of p-amino phenol. One object of our invention is to provide a process which can be carried out in concentrated solutions, and without the use of a buffering agent. Another object is to provide a process of purification which will not contaminate the methyl-p-amino phenol with reagents which can be removed only by means of expensive and time-consuming methods.

Methyl-p-amino phenol, in the form of its sulfate, is a well-known photographic developer, known under the trade names of Elon and Metol. The purification of methyl-p-amino phenol sulfate involves the removal of small amounts of p-amino phenol sulfate present as an impurity. The p-amino phenol sulfate cannot be separated readily by crystallization. In this specification and in the claims, when we refer to an aqueous solution of methyl-p-amino phenol, or of its sulfate, we mean an aqueous solution in which methyl-p-amino phenol is substantially in equilibrium with sulfuric acid, so that upon evaporation of the solution, methyl-p-amino phenol sulfate crystallizes out. It will be understood that in such a solution, any p-amino phenol present is also substantially in equilibrium with sulfuric acid.

The separation of p-amino phenol from methyl-p-amino phenol has heretofore been carried out by treating the crude methyl-p-amino phenol in aqueous solution with benzaldehyde in the presence of a buffering agent, such as sodium acetate, thus obtaining an insoluble benzylidene compound by the condensation of benzaldehyde with the p-amino phenol, according to the reaction

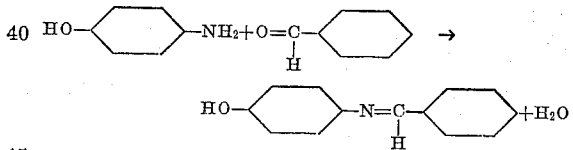

That process can be carried out only in the cold and in dilute solution, thus involving large volumes of solution which have subsequently to be worked up by suitable means for the separation and recovery of the methyl-p-amino phenol sulfate from the reagents employed. This has usually been done by elaborate methods of extraction of the free methyl-p-amino phenol by solvents, or by fractional crystallization, either of which methods involved expense and loss.

We have discovered that p-amino phenol can be removed from boiling aqueous solutions of methyl-p-amino phenol, without the use of a buffering agent, by employing, instead of benzaldehyde, the halogenated salicylaldehyde, such, for instance, as 5-bromosalicylaldehyde, 3:5-dibromosalicylaldehyde, or 3:5-dichlorosalicylaldehyde. We have found that the halogenated salicylaldehydes are capable of precipitating p-amino phenol from boiling aqueous solutions of methyl-p-amino phenol, even when the solutions are of comparatively high acidity and concentration. The halogenated salicylaldehydes are almost insoluble in water, but in boiling aqueous solution they react slowly with any p-amino phenol present, to form insoluble benzylidene compounds, so that upon continued boiling the p-amino phenol is quantitatively removed from the solution. Moreover, any excess of the halogenated salicylaldehyde does not dissolve, and hence can be filtered off, together with the benzylidene compound, leaving a pure aqueous solution of methyl-p-amino phenol. The method is effectively used with crude methyl-p-amino phenol sulfate containing as high as 4% of a p-amino phenol as an impurity. The halogenated salicylaldehyde can be easily recovered in pure form from its benzylidene compound by steam distilling in the presence of dilute mineral acid, the halogenated salicylaldehydes being volatile in steam. The excess of halogenated salicylaldehyde, which was filtered off together with the benzylidene compound, is of course recovered at the same time. The recovered reagent is in pure form and suitable for re-use.

The following examples will illustrate the method of carrying out our invention.

*Example 1.*—50 g. of crude methyl-p-amino phenol sulfate containing 1.23% of p-aminophenol is dissolved in 200 cc. of boiling water. To the boiling solution are added a trace of sodium hydrosulfite to decolorize the solution, calcium ferrocyanide in calculated amount to remove the iron known to be present, and 50% excess over the calculated amount of 5-bromosalicylaldehyde. The mixture is vigorously stirred on a steam bath for 3 hours. It is then filtered hot and allowed to crystallize. The crystals of methyl-p-amino phenol sulfate are found to contain 0.80% of p-aminophenol. The benzylidene compound formed by the reaction of the 5:bromosalicylaldehyde with p-aminophenol has the formula:

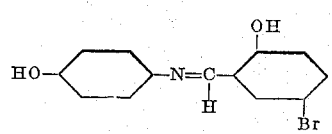

*Example 2.*—The purification is carried out as in Example 1, except that 3:5-dibromosalicylaldehyde is used in place of 5-bromosalicylaldehyde. The purified product contains 0.15% of p-aminophenol.

*Example 3.*—The purification is carried out as in Example 1, except that 3:5-dichlorosalicylaldehyde is used in place of 5-bromosalicylaldehyde. The purified product contains 0.22% of p-aminophenol.

It will be understood that the above examples are merely illustrative, and that we are not to be limited by them except as indicated in the appended claims.

While we may use any of the halogenated salicylaldehydes mentioned above, or any of the other halogenated salicylaldehydes, we prefer to use 3:5-dichlorosalicylaldehyde, on account of its lower cost and ease of preparation. The preparation of these compounds is set forth or illustrated in the literature.

What we claim as our invention and desire to be secured by Letters Patent of the United States is:

1. A process of purifying an aqueous solution of crude methyl-p-amino phenol containing p-amino phenol, which comprises converting the p-amino phenol into an insoluble derivative by boiling the aqueous solution with a halogenated salicylaldehyde.

2. A process of purifying an aqueous solution of crude methyl-p-amino phenol containing p-amino phenol, which comprises converting the p-amino phenol into an insoluble derivative by boiling the aqueous solution with 3:5-dichlorosalicylaldehyde.

3. A process of purifying an aqueous solution of crude methyl-p-amino phenol containing p-amino phenol, which comprises converting the p-amino phenol into an insoluble derivative by boiling the aqueous solution with 5-bromosalicylaldehyde.

4. A process of purifying an aqueous solution of crude methyl-p-amino phenol containing p-amino phenol, which comprises converting the p-amino phenol into an insoluble derivative by boiling the aqueous solution with 3:5-dibromosalicylaldehyde.

5. A process of purifying an aqueous solution of crude methyl-p-amino phenol containing p-amino phenol, which comprises converting the p-amino phenol into an insoluble derivative by boiling the aqueous solution with a halogenated salicylaldehyde in the absence of any substance intended to act as a buffering agent.

6. A process of purifying an aqueous solution of crude methyl-p-amino phenol containing p-amino phenol, which comprises converting the p-amino phenol into an insoluble derivative by boiling the aqueous solution with 3:5-dichlorosalicylaldehyde in the absence of any substance intended to act as a buffering agent.

7. A process of purifying an aqueous solution of crude methyl-p-amino phenol containing p-amino phenol, which comprises converting the p-amino phenol into an insoluble derivative by boiling the aqueous solution with 5-bromosalicylaldehyde in the absence of any substance intended to act as a buffering agent.

8. A process of purifying an aqueous solution of crude methyl-p-amino phenol containing p-amino phenol, which comprises converting the p-amino phenol into an insoluble derivative by boiling the aqueous solution with 3:5-dibromosalicylaldehyde in the absence of any substance intended to act as a buffering agent.

ARTHUR W. M. DICKINS.
CHARLES R. FORDYCE.